UNITED STATES PATENT OFFICE.

RUDOLPH KNIETSCH, OF LUDWIGSHAFEN, GERMANY, ASSIGNOR TO THE BADISCHE ANILIN AND SODA FABRIK, OF SAME PLACE.

BLUE DYE.

SPECIFICATION forming part of Letters Patent No. 524,256, dated August 7, 1894.

Application filed September 28, 1893. Serial No. 486,668. (Specimens.) Patented in England June 5, 1890, No. 8,726; in Belgium February 28, 1891, No. 93,863; in Italy March 28, 1891, XXV, 29,239, LVII, 257; in Spain April 25, 1891, No. 11,774; in France May 26, 1891, No. 206,567; in Austria-Hungary August 6, 1891, No. 41 and No. 2,153, and in Russia October 3, 1892, No. 10,700.

*To all whom it may concern:*

Be it known that I, RUDOLPH KNIETSCH, doctor of philosophy, a subject of the King of Prussia, residing at Ludwigshafen-on-the-Rhine, in the Kingdom of Bavaria and Empire of Germany, have invented new and useful Improvements in the Manufacture of Synthetical Indigo-Sulfo Acid, (for which patents have been obtained in Great Britain, No. 8,726, dated June 5, 1890; in France, No. 206,567, dated May 22, 1891; in Belgium, No. 93,863, dated February 28, 1891; in Italy, XXV, 29,239, and LVII, 257, dated March 28, 1891; in Austria-Hungary, Tome 41, fol. 2,153, dated August 6, 1891; in Russia, No. 10,700, dated October 3, 1892, and in Spain, No. 11,774, dated April 25, 1891,) of which the following is a specification.

My invention relates to the manufacture of new blue coloring-matter soluble in water which dyes animal fiber from an acid bath. The said coloring-matter is obtained by suitably treating phenyl-glycocoll with fuming sulfuric acid.

If phenyl-glycocoll either directly as such or after dilution by mixing with concentrated monohydrate or weakly fuming sulfuric acid and the like be dissolved in fuming sulfuric acid containing at least twenty per cent. free anhydride, and if the solution be then diluted with water in any suitable form, a blue solution is obtained. As suitable methods of effecting the dilution with water, I mention treatment with a stream of moist air with ice, with sulfuric acid containing water, and the like.

The yield of coloring-matter is greatest when very strong fuming acid is used, such for instance as acid containing from seventy to one hundred per cent. free anhydride ($SO_3$).

The structural formula of phenyl glycocoll is as follows: $C_6H_5.NH.CH_2.COOH$., and if this substance is treated with strong fuming sulfuric acid, the reaction which takes place consists in a splitting off of water resulting in an internal condensation accompanied by sulfonation and oxidation.

The nature of my new coloring-matter varies to a certain extent according to the method that is adopted for working up or isolating the color. Thus, if a solution of phenyl-glycocoll in fuming sulfuric acid containing about eighty to ninety per cent. free anhydride be diluted by pouring sulfuric acid containing water into it, then the coloring-matter is obtained in what I for convenience term form A. If the diluting operation be inverted, that is, if the fuming mixture be poured under suitable conditions into the acid containing water then the form B results.

Form A of my new coloring-matter differs chemically from form B, in being more highly sulfonated, and in some other qualities as are hereinafter more particularly set forth.

The following examples will illustrate the manner in which my invention can best be carried into practical effect.

*Example* 1. *Production in the form A.—* Dissolve about one part by weight of phenyl-glycocoll in two or three parts of monohydrate sulfuric acid at a temperature of about 20° to 30° centigrade, then as carefully and slowly as possible mix the resulting thick solution with about from twelve to twenty times the quantity of fuming sulfuric acid containing about ninety per cent. free anhydride ($SO_3$), also at a temperature of about 20° to 30° centigrade. A thick yellow to brown red solution is obtained.

To obtain the new coloring-matter in the form A, run into this solution sulfuric acid containing about twenty-two per cent. water at a temperature of about 20° to 30° centigrade, taking from twelve to twenty parts thereof, or in any case such quantity that the mass no longer fumes. The reddish color of the mixture finally changes to an intense blue. To complete the reaction, blow a stream of air through the solution. Next, dilute the solution with ten times the volume of water and precipitate the dye with common salt. Collect and dry. The dye thus obtained does not appear to be an isolated chemical individual, but consists of a mixture. It is not necessary to effect a further separation or purification before applying it in dyeing, but if desired this can be done by fractional precipitation of a solution of the product with common salt.

*Example 2. Production in the form B.*—Make a solution of one part phenyl-glycocoll in about three parts monohydrate sulfuric acid at a temperature of about 20° centigrade as hereinbefore described in Example 1 and pour this solution into about twenty times the quantity of fuming sulfuric acid containing about ninety per cent. free anhydride ($SO_3$). In this case as it is desired to obtain the coloring-matter in the form B the mixture with the fuming acid should be effected as quickly as is possible, without causing the temperature to rise above 30° centigrade, and then the solution obtained should be immediately mixed at a temperature between zero and 30° centigrade with about twenty-two parts of sulfuric acid containing about twenty-two per cent. water. Pass a stream of air through the bright blue solution and then pour the whole into ten times the volume of water. Add about seven or eight parts of common salt, which will be sufficient to precipitate a considerable quantity of color possessing a bright coppery luster. Collect and dry. The solution still contains coloring-matter which can be precipitated by saturating with common salt, this resembles the product obtained by working according to Example 1.

In the above examples, I have described two extreme methods of working, which yield the products which show variations in character as great as are practically obtained in useful manufacture according to my invention; by varying the conditions of either example to approach more nearly those of the other, the dyestuff obtained is a mixture of the forms described as A and B varying in proportionate composition according to the variations made in the process and possessing corresponding properties.

My new dyestuff possesses the following properties: It is an acid coloring-matter soluble in water and in alcohol giving blue solutions; insoluble in ether and benzene and dyeing animal fiber, from the acid bath.

The form A has more strongly acid properties than form B and fills itself more rapidly on fiber, giving redder shades than form B; it is dark blue in color, possessing but little or no metallic luster; it is more soluble in salt solution than form B. The form B possesses a characteristic coppery luster. It dyes animal fiber slowly and most equally from the acid bath, giving beautiful shades of blue. It is readily precipitated from its aqueous solutions by common salt.

What I claim as new, and desire to secure by Letters Patent, is—

1. The process consisting in dissolving phenyl-glycocoll in strongly fuming sulfuric acid, then diluting the solution by adding sulfuric acid containing water, then passing a current of air through the solution and finally isolating the coloring-matter formed all substantially as hereinbefore described.

2. The process consisting in dissolving phenyl-glycocoll in strongly fuming sulfuric acid then diluting the solution by pouring it into sulfuric acid containing water, then passing air through the solution and finally isolating the coloring matter formed all substantially as hereinbefore described.

3. As a new article of manufacture the blue dyestuff which can be obtained by treating phenyl-glycocoll with strongly fuming sulfuric acid, which is an acid dye, soluble in water and in alcohol, giving blue solutions and which is insoluble in ether and benzene.

In testimony whereof I have hereunto set my hand in the presence of two subscribing witnesses.

RUDOLPH KNIETSCH.

Witnesses:
ERNEST F. EHRHARDT,
ADOLPH REUTLINGER.